(12) United States Patent
Morrison et al.

(10) Patent No.: US 12,528,377 B2
(45) Date of Patent: Jan. 20, 2026

(54) SMART ENERGY CENTER RATIONALITY AND REDUNDANCY

(71) Applicant: GM Global Technology Operations LLC, Detroit, MI (US)

(72) Inventors: James Morrison, Sebringville (CA); Lyall Kenneth Winger, Waterloo (CA); Xinyu Du, Oakland Township, MI (US); Infane Lowe, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 650 days.

(21) Appl. No.: 18/149,321

(22) Filed: Jan. 3, 2023

(65) Prior Publication Data
US 2024/0217365 A1    Jul. 4, 2024

(51) Int. Cl.
*B60L 53/62* (2019.01)
*B60L 53/66* (2019.01)

(52) U.S. Cl.
CPC ............... *B60L 53/62* (2019.02); *B60L 53/66* (2019.02)

(58) Field of Classification Search
None
See application file for complete search history.

(56) References Cited

U.S. PATENT DOCUMENTS

| 11,349,475 | B1 | 5/2022 | Winger et al. | |
| 2010/0070220 | A1* | 3/2010 | Darilek | G01R 31/3828 324/427 |
| 2016/0129801 | A1* | 5/2016 | Gale | H02J 7/00047 320/162 |

* cited by examiner

*Primary Examiner* — Giovannia Astacio-Oquendo
*Assistant Examiner* — Carl F. R. Tchatchouang
(74) *Attorney, Agent, or Firm* — CANTOR COLBURN LLP (57) ABSTRACT

A vehicle smart energy center includes an array of electronic fuses coupling a DC power bus to a plurality of loads and primary and supplemental electrical power sources. Electronic fuses self-diagnose health and report current, voltage and temperature data which is used by a smart energy center control module to manage the diagnostic, current, voltage and temperature data and electronic fuses for fault remediation whereby the vehicle remains operable through various smart energy center anomalies.

20 Claims, 3 Drawing Sheets

SMART ENERGY CENTER RATIONALITY AND REDUNDANCY

INTRODUCTION

The present disclosure generally relates to electrical energy distribution in mobile platforms.

Smart energy centers (SEC), including electronic fuses (eFuses), are increasingly used to meet load current demands in vehicle applications, in place of or complementing fuses, circuit breakers, or other current interruption devices. An eFuse may provide active circuit protection with an integrated FET used to limit currents during fault conditions. In addition to basic current interruption functionality, eFuses advantageously include load profile monitoring and control and may protect loads against inrush current, overcurrent, overvoltage, reverse current, reverse polarity and short circuit faults. Self-monitoring by eFuses may provide current, voltage and temperature information for health monitoring. Additionally, SECs are advantageous in their flexibility across vehicle platforms and variable electrical contenting at the vehicle level. Thus, to a great degree, SECs and eFuses allow for electrical energy distribution that is software defined and controllable, including software based monitoring, diagnostics and prognostics.

SUMMARY

In one exemplary embodiment, an electrical power distribution system may include a plurality of electronic fuses self-reporting respective currents coupled between a direct current (DC) power bus and a plurality of loads, at least one main DC power electronic fuse coupled between a DC power source and the DC power bus, and a control module performing a current balancing rationality check based upon all self-reported currents through the plurality of electronic fuses. When the current balancing rationality check indicates a faulty self-reported current, the one of the plurality of electronic fuses corresponding to the faulty self-reported current is identified through current balancing based upon the other self-reported currents, and the identified one of the plurality of electronic fuses is remediated by selectively including substituting a calculated current for the faulty self-reported current based upon the other self-reported currents.

In addition to one or more of the features described herein, the plurality of electronic fuses may self-report respective voltages, and the control module may further perform a voltage rationality check for one of the plurality of electronic fuses in a cluster of electronic fuses servicing a common load based upon self-reported voltages outputs from the others of the plurality of electronic fuses in the cluster of electronic fuses servicing the common load.

In addition to one or more of the features described herein, the plurality of electronic fuses may self-report respective voltages, and the control module may further perform a voltage rationality check for one of the plurality of electronic fuses servicing a load based upon a voltage reported by the load.

In addition to one or more of the features described herein, the plurality of electronic fuses may self-report respective voltages, and the control module may further perform a voltage rationality check for one of the plurality of electronic fuses servicing a load based upon a calculated voltage drop across the one of the plurality of electronic fuses.

In addition to one or more of the features described herein, the plurality of electronic fuses may self-report respective temperatures, and the control module may further perform a temperature rationality check for one of the plurality of electronic fuses based upon self-reported temperature outputs from another of the plurality of electronic fuses physically adjacent to the one of the plurality of electronic fuses.

In addition to one or more of the features described herein, the plurality of electronic fuses may self-report respective temperatures, wherein the control module remediating the identified one of the plurality of electronic fuses may further include performing rationality checks upon the self-reported temperature of the identified one of the plurality of electronic fuses based upon the self-reported temperature of at least one other of the plurality of electronic fuses that is physically adjacent to the identified one of the plurality of electronic fuses.

In addition to one or more of the features described herein, the control module remediating the identified one of the plurality of electronic fuses may further include derating the identified one of the plurality of electronic fuses.

In addition to one or more of the features described herein, the control module remediating the identified one of the plurality of electronic fuses may further include derating a load serviced by the identified one of the plurality of electronic fuses.

In addition to one or more of the features described herein, the identified one of the plurality of electronic fuses may include one of a subset of the plurality of electronic fuses servicing a common load, wherein the control module remediating the identified one of the plurality of electronic fuses may further selectively include turning off the identified one of the plurality of electronic fuses and reallocating current from the identified one of the plurality of electronic fuses to the others of the subset of the plurality of electronic fuses servicing the common load.

In another exemplary embodiment, an electrical power distribution system may include a first plurality of electronic fuses self-reporting respective currents, voltages and temperatures, the first plurality of electronic fuses coupled between a direct current (DC) power bus and a plurality of loads, a second plurality of electronic fuses self-reporting respective currents, voltages and temperatures, the second plurality of electronic fuses coupled between the DC power bus and at least one DC power source, at least one main DC power electronic fuse coupled between a battery management system and the DC power bus, and a control module performing a current balancing rationality check based upon all self-reported currents through the first plurality of electronic fuses, the second plurality of electronic fuses and a current through the at least one main DC power electronic fuse. When the current balancing rationality check indicates a faulty self-reported current, the one of the first and second pluralities of electronic fuses corresponding to the faulty self-reported current through current balancing based upon the other self-reported currents is identified, and the identified one of the first and second pluralities of electronic fuses corresponding to the faulty self-reported current is remediated including substituting a calculated current for the faulty self-reported current based upon the other non-faulty self-reported currents. A diagnostic check of the self-reported currents, voltages and temperatures of the first and second pluralities of electronic fuses is performed to detect an anomalous self-reported current, an anomalous self-reported voltage or an anomalous self-reported temperature. When the diagnostic check indicates an anomalous self-reported current, the one of the first and second pluralities of electronic fuses corresponding to the anomalous self-reported current is identified, and the identified one of the first and second pluralities of electronic fuses corresponding to the anomalous self-reported current is remediated including substituting a calculated current for the anomalous self-reported current based upon the other non-anomalous self-reported currents. When the diagnostic check indicates an anomalous self-reported voltage, the one of the first and second pluralities of electronic fuses corresponding to the anomalous self-reported voltage and an associated load are identified, and the identified one of the first and second pluralities of electronic fuses corresponding to the anomalous self-reported voltage is remediated including substituting one of a) a self-reported voltage from one or more electronic fuse of the first and second pluralities commonly coupled to the associated load, b) a voltage reported from the associated load, and c) a voltage calculated based upon a voltage drop across the one of the first and second pluralities of electronic fuses corresponding to the anomalous self-reported voltage. When the diagnostic check indicates an anomalous self-reported temperature, the one of the first and second pluralities of electronic fuses corresponding to the anomalous self-reported temperature is identified, and the identified one of the first and second pluralities of electronic fuses corresponding to the anomalous self-reported temperature is remediated including substituting a self-reported temperature from one or more electronic fuse of the first and second pluralities of electronic fuses physically adjacent to the one of the first and second pluralities of electronic fuses corresponding to the anomalous self-reported temperature.

In addition to one or more of the features described herein, the control module remediating the identified one of the first and second pluralities of electronic fuses corresponding to the anomalous self-reported current may further include derating the identified one of the first and second pluralities of electronic fuses corresponding to the anomalous self-reported current.

In addition to one or more of the features described herein, the control module remediating the identified one of the first and second pluralities of electronic fuses corresponding to the anomalous self-reported current may further include derating a load serviced by the identified one of the plurality of electronic fuses.

In addition to one or more of the features described herein, the identified one of the first and second pluralities of electronic fuses corresponding to the anomalous self-reported current may include one of a subset of the first and second pluralities of electronic fuses servicing a common load, wherein the control module remediating the identified one of the first and second pluralities of electronic fuses corresponding to the anomalous self-reported current may further selectively include turning off the identified one of the first and second pluralities of electronic fuses corresponding to the anomalous self-reported current and reallocating current from the identified one of the first and second pluralities of electronic fuses corresponding to the anomalous self-reported current to the others of the subset of the first and second pluralities of electronic fuses servicing the common load.

In addition to one or more of the features described herein, the control module remediating the identified one of the first and second pluralities of electronic fuses corresponding to the anomalous self-reported current may further include adjusting current limits of the others of the subset of the first and second pluralities of electronic fuses servicing the common load.

In yet another exemplary embodiment, a method for power distribution may include coupling a first plurality of electronic fuses between a direct current (DC) power bus and a plurality of loads, wherein the first plurality of electronic fuses self-report respective currents, voltages and temperatures, coupling a second plurality of electronic fuses between the DC power bus and at least one DC power source, wherein the second plurality of electronic fuses self-report respective currents, voltages and temperatures, coupling at least one main DC power electronic fuse between a battery management system and the DC power bus, and performing a current balancing rationality check based upon all self-reported currents through the first plurality of electronic fuses, the second plurality of electronic fuses and a current through the at least one main DC power electronic fuse. When the current balancing rationality check indicates a faulty self-reported current, the one of the first and second pluralities of electronic fuses corresponding to the faulty self-reported current through current balancing is identified based upon the other self-reported currents, and the identified one of the first and second pluralities of electronic fuses corresponding to the faulty self-reported current is remediated including substituting a calculated current for the faulty self-reported current based upon the other non-faulty self-reported currents. A diagnostic check of the self-reported currents, voltages and temperatures of the first and second pluralities of electronic fuses is performed to detect an anomalous self-reported current, an anomalous self-reported voltage or an anomalous self-reported temperature. When the diagnostic check indicates an anomalous self-reported current, the one of the first and second pluralities of electronic fuses corresponding to the anomalous self-reported current is identified, and the identified one of the first and second pluralities of electronic fuses corresponding to the anomalous self-reported current is remediated including substituting a calculated current for the anomalous self-reported current based upon the other non-anomalous self-reported currents. When the diagnostic check indicates an anomalous self-reported voltage, the one of the first and second pluralities of electronic fuses corresponding to the anomalous self-reported voltage and an associated load is identified, and the identified one of the first and second pluralities of electronic fuses corresponding to the anomalous self-reported voltage is remediated including substituting one of a) a self-reported voltage from one or more electronic fuse of the first and second pluralities commonly coupled to the associated load, b) a voltage reported from the associated load, and c) a voltage calculated based upon a voltage drop across the one of the first and second pluralities of electronic fuses corresponding to the anomalous self-reported voltage. When the diagnostic check indicates an anomalous self-reported temperature, the one of the first and second pluralities of electronic fuses corresponding to the anomalous self-reported temperature is identified, and the identified one of the first and second pluralities of electronic fuses corresponding to the anomalous self-reported temperature is remediated including substituting a self-reported temperature from one or more electronic fuse of the first and second pluralities of electronic fuses physically adjacent to the one of the first and second pluralities of electronic fuses corresponding to the anomalous self-reported temperature.

In addition to one or more of the features described herein, wherein remediating the identified one of the first and second pluralities of electronic fuses corresponding to the anomalous self-reported current may further include derating the identified one of the first and second pluralities of electronic fuses corresponding to the anomalous self-reported current.

In addition to one or more of the features described herein, wherein remediating the identified one of the first and second pluralities of electronic fuses corresponding to the anomalous self-reported current may further include derating a load serviced by the identified one of the plurality of electronic fuses.

In addition to one or more of the features described herein, wherein the identified one of the first and second pluralities of electronic fuses corresponding to the anomalous self-reported current may include one of a subset of the first and second pluralities of electronic fuses servicing a common load, wherein remediating the identified one of the first and second pluralities of electronic fuses corresponding to the anomalous self-reported current may further selectively include turning off the identified one of the first and second pluralities of electronic fuses corresponding to the anomalous self-reported current and reallocating current from the identified one of the first and second pluralities of electronic fuses corresponding to the anomalous self-reported current to the others of the subset of the first and second pluralities of electronic fuses servicing the common load.

In addition to one or more of the features described herein, wherein remediating the identified one of the first and second pluralities of electronic fuses corresponding to the anomalous self-reported current may further include adjusting current limits of the others of the subset of the first and second pluralities of electronic fuses servicing the common load.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like) which may carry out a variety of functions under the control of one or more microprocessors or other control devices.

As used herein, electronic control unit (ECU), control module, module, control, controller, control unit, electronic control unit, processor and similar terms may refer to any hardware, software, firmware, electronic control component, processing logic, and/or processor device, individually or in any combination. In various embodiments, a control module may include any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Exemplary embodiments may provide robust electrical power distribution, fault diagnosis and recovery. Embodiments may leverage a preconfigured fuse harness and use a connection scheme to match it with an eFuse array. Embodiments provide control and monitoring functionality to dynamically reallocate currents responsive to detected anomalous eFuses.

A control module may control eFuse parameters for power distribution, such that the control module may reconfigure eFuse power allocation. As is described in more detail below, embodiments advantageously maintain levels of system performance during electrical anomalies, in addition to providing redundant power paths in the event of a fault/failed eFuse.

Figure 1:
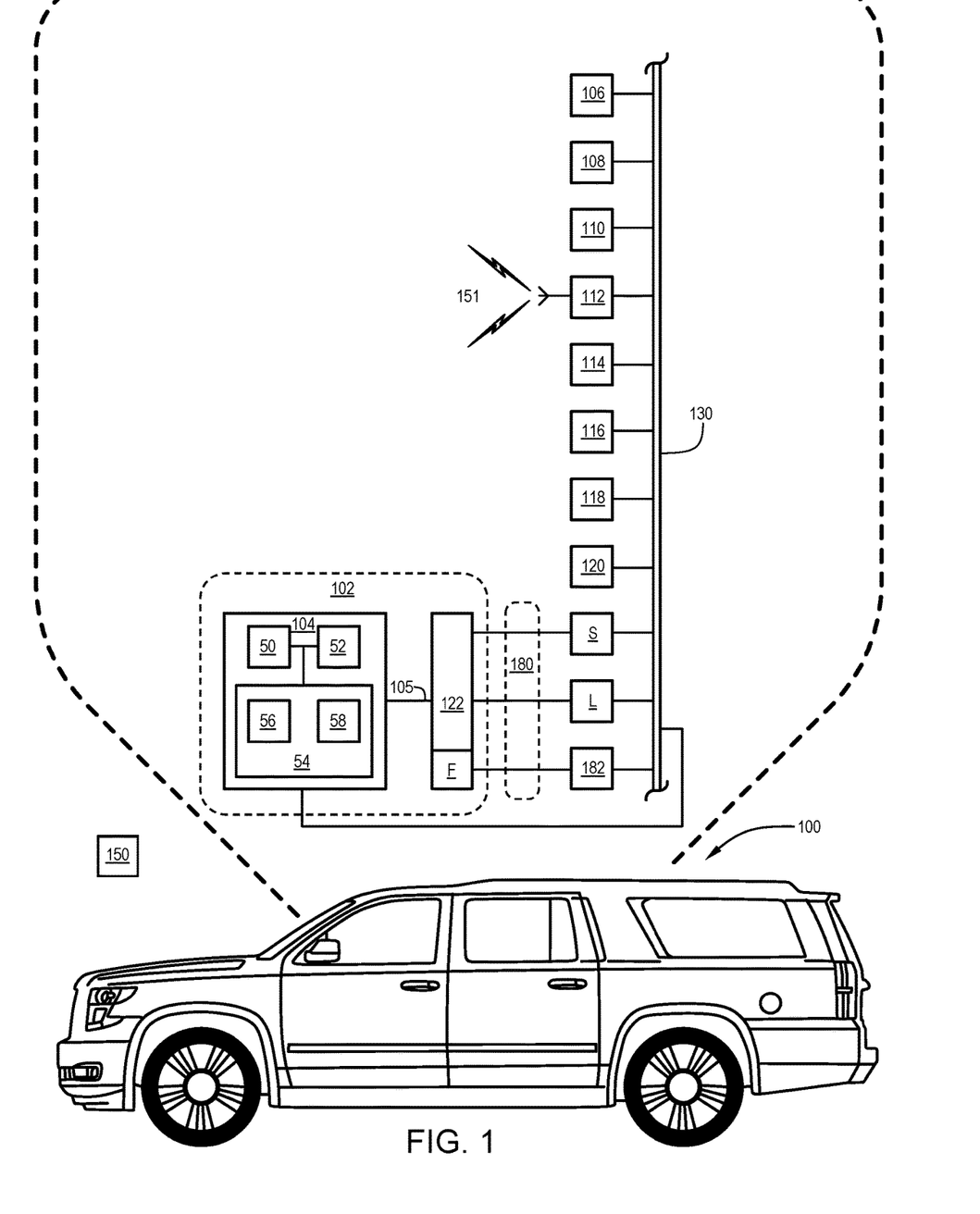
FIG. 1 illustrates a vehicle including a smart energy center, in accordance with one or more embodiments.

FIG. 1 is a functional block diagram depicting an exemplary mobile platform as a vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. As is generally understood, the vehicle 100 may embody a body, chassis, and wheels, each of which are rotationally coupled to the chassis near a respective corner of the body. The vehicle 100 may be a four wheel vehicle, but the number of wheels may vary in other embodiments. The vehicle 100 may be autonomous or semi-autonomous. In the present exemplary embodiment, the vehicle 100 may be an electrified vehicle (EV) which may include a battery electric vehicle (BEV) or a hybrid electric vehicle (HEV). Other embodiments may include internal combustion (IC) vehicles. The vehicle 100 may include a battery management system 182 and a collective functional block, drive systems 106, which generally may include known vehicle systems for vehicle operation, such as, a propulsion system, a transmission system, a steering system, actuators for the wheels, and a brake system, and generates a variety of signals, including vehicle speed and vehicle acceleration. In various embodiments, the battery management system 182 and drive systems 106 are operatively coupled to one or more onboard components and systems via a communication bus 130. The battery management system 182 may include a high voltage battery pack primarily for servicing an electric propulsion system and one or more low voltage batteries primarily for servicing vehicle accessory loads. Low voltage batteries may provide electrical power for distribution by an SEC 102 via a fuse harness 180.

External sources 150 may include one or more other mobile or stationary platforms (also referred to herein as "road actors") that are external to the vehicle 100, in the environment surrounding the vehicle 100.

A system for electrical power distribution configured to drive a fuse harness 180 operatively coupled to multiple loads and sources, shown generally as SEC 102, may include a control module 104, an eFuse array 122 and a bus 105 operably coupling the control module 104. In various embodiments, the SEC 102 may distribute electrical power to other modules onboard the vehicle 100. In various embodiments, the control module 104 is communicatively coupled to onboard systems and components via the communication bus 130. The control module 104 may transmit and receive control commands, requests and data for various onboard systems and components, and for various road actors 150 external the vehicle 100 via a transceiver 112.

The vehicle 100 may include one or more other components or onboard systems that may each communicate with the control module 104, generally via the communication bus 130. Non-limiting examples of the onboard components and systems include the drive systems 106, the battery management system 182, a vehicle controller 108, user interface 114, the transceiver 112, a global positioning system (GPS) 116, a camera system 118 and sensors, a mapping system 110, a navigation system 120, and the fuse harness 180. The functions and operations of each of these components or systems are described in more detail herein.

In various embodiments, the vehicle controller 108 may receive and integrate communications from a variety of modules and systems present in the vehicle 100. Accordingly, in some embodiments, the inputs provided by the vehicle controller 108 to the control module 104 may include or represent user inputs, mobile applications and systems inputs, inputs from off-board communications (e.g., via the transceiver 112), and inputs that are based on the global positioning system (GPS 116), navigation system 120, mapping system 110, camera system 118 and sensors, and drive systems 106.

The user interface 114 may provide any combination of touch, voice/audio, cursor, button press and gesture control for a passenger in the vehicle 100. Accordingly, the user interface 114 may include a display device and an audio device and dialogue manager, as is known in the industry.

The transceiver 112 may be configured to enable communication between onboard components and systems and various external sources 150, such as cloud server systems. Accordingly, in various embodiments, the transceiver 112 may include the hardware and software to support one or more communication protocols for wireless communication 151 (e.g., Wi-Fi and Bluetooth) between the control module 104 and external sources, such as routers, internet, the cloud, satellites, communication towers and ground stations.

GPS 116 is a global positioning system as is known in the mobile platform industry. GPS 116 may interact via the transceiver 112 and various external sources to provide information about a location in three-dimensional space of the vehicle at any given time.

Mapping system 110, when present on the vehicle 100, may include or externally access a database storing up to date and high-resolution maps of streets, environmental features, and the like in known layered arrangements.

Navigation system 120 may obtain and process signals from various onboard components to make determinations about current location, trajectory, speed, acceleration, etc., as well as coordinate with the vehicle controller 108, GPS 116, and mapping system 110 to plan a future location, trajectory, speed, acceleration, turns, and the like.

The camera system 118 and sensors may include one or more cameras and sensors for detecting location and movement of road actors and features and objects surrounding the vehicle. The sensors in the camera system 118 and sensors may be configured to transmit, receive, and process lidar, radar, or other signals to make determinations about location and movement of nearby road actors.

In various embodiments, as shown in FIG. 1, the control module 104 may include a computer readable storage device or media, memory 54, for storage of instructions, algorithms, or programs 56, such as an eFuse allocation algorithm and operating parameters 58, such as, preprogrammed eFuse data (for each Fn in the eFuse array) including preprogrammed load current thresholds, critical current thresholds (e.g., eFuse limits), voltage thresholds, and temperature thresholds, and a preconfigured fuse harness 180 configuration. The control module 104 may include a processor 50 to execute the program 56, and an input/output (I/O) interface 52. The computer readable storage device or media, memory 54, may include volatile and nonvolatile storage in read-only memory (ROM), random-access memory (RAM), and non-volatile memory that may be used to store various operating variables while the processor 50 is powered down. The memory 54 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the SEC 102. The memory 54 may also be utilized by the processor 50 to cache data, to temporarily store results of comparisons and analyses, and the like. Information in the memory 54 may be organized and/or imported from an external source during an initialization or installment operation in a method; it may also be programmed via wired or wireless I/O interfaces.

The I/O interface 52 may be operatively coupled to the processor 50 via a bus and enables communication within and external to the control module 104. The I/O interface 52 may include one or more wired and/or wireless network interfaces and may be implemented using any suitable method and apparatus. In various embodiments, the I/O interface 52 may include hardware and software to support one or more communication protocols for wireless communication between the processor 50 and external sources, such as satellites, cloud resources, communication towers and ground stations. In various embodiments, the I/O interface 52 supports communication with technicians, and/or one or more storage interfaces for direct connection to storage apparatuses.

During operation of the SEC 102, the processor 50 executes one or more algorithms, instructions, and rules embodied as program 56, and controls the general operation of the SEC 102. During operation of the SEC 102, the processor 50 may receive data from the communication bus 130 or external sources. In various embodiments of the SEC 102, the control module 104 may: perform operations attributed to the SEC 102 in accordance with an algorithm; perform operations in accordance with state machine logic; and perform operations in accordance with logic in a programmable logic array. While the exemplary embodiment of the SEC 102 is described in the context of the control module 104 implemented as a centralized processor based control module, those skilled in the art will recognize that the mechanisms of the present disclosure are capable of being carried out in a distributed manner among several networked control modules.

The fuse harness 180 interfaces the SEC 102, including the plurality of eFuses, with multiple loads (L) onboard the vehicle and with electrical power sources including one or more batteries of the battery management system 182 and other electrical energy sources (S) (e.g., auxiliary power module (APM), generators, etc.). The low voltage batteries of the battery management system 182 may primarily provide electrical energy for distribution by the SEC 102, whereas other electrical energy sources (S) may supplement the energy from the low voltage batteries. In various embodiments, some or all the components and systems coupled to the communication bus 130 may be considered one of the multiple loads (L) that are operatively coupled to the fuse harness 180.

Figure 2:
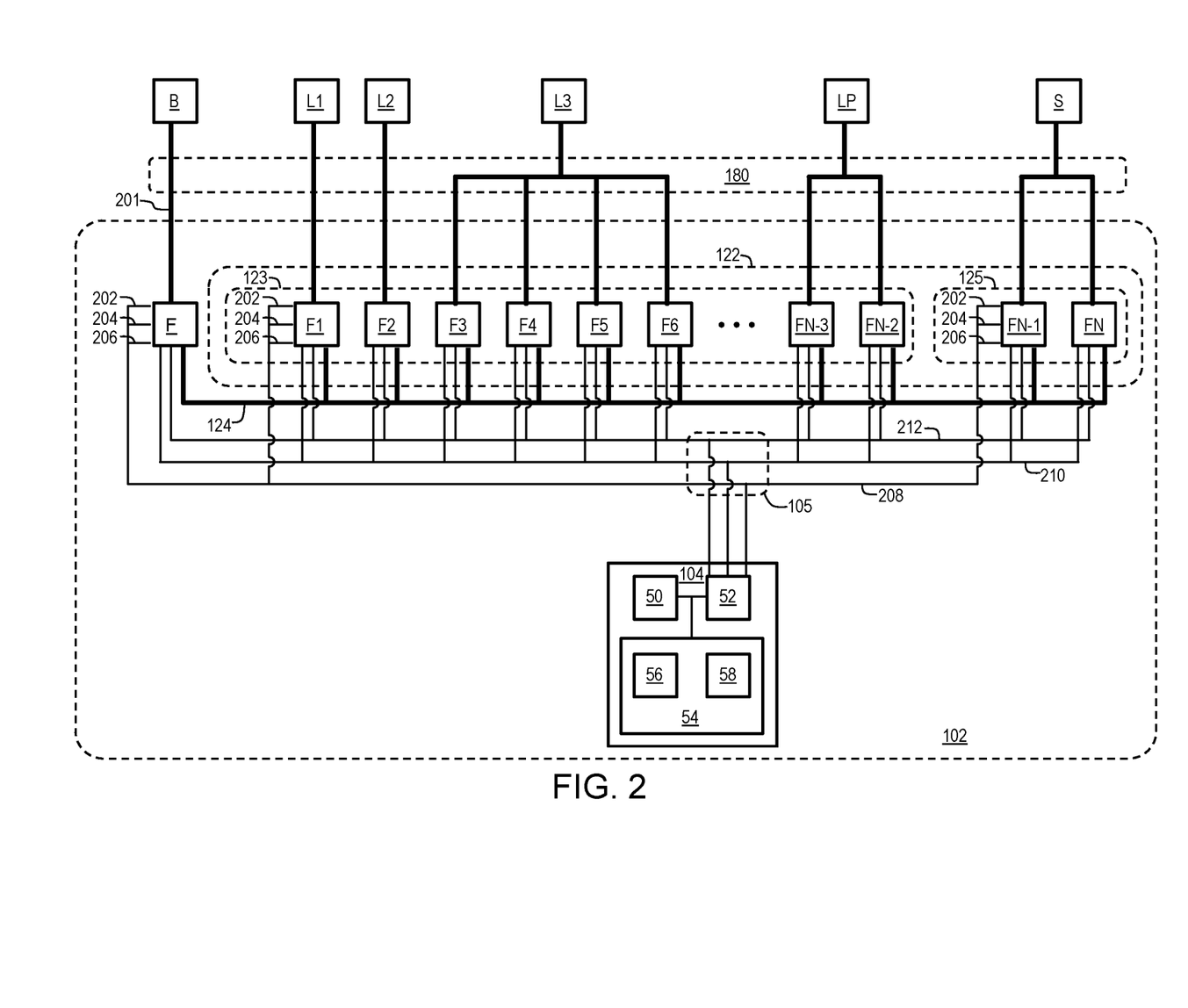
FIG. 2 illustrates a smart energy center for managing electrical power distribution, in accordance with one or more embodiments.

FIG. 2 illustrates the SEC 102 including eFuse array 122, loads, and sources as used herein, and a fuse harness 180. In FIG. 2, the relatively thick, solid lines represent direct current (DC) power conductors for distribution of electrical power. Likewise in FIG. 2, the relatively thin, solid lines represent communication, command and data lines/buses and low power DC bus among eFuses and the control module 104. A main DC power eFuse (F) may controllably couple DC power through line 201 from a battery (B) or alternative DC power source to a DC power bus 124. The DC power bus 124 is controllably coupled to a plurality of loads (Ln), and one or more electrical energy sources (S). The eFuse array 122 is an arrangement or grouping of eFuses. Electrical power from the DC power bus 124 to the vehicle loads Ln is controllably distributed via a load grouping 123 eFuse subset of the eFuse array 122. Distribution of supplemental electrical power from the electrical energy sources (S) to the DC power bus 124 is via a source grouping 125 eFuse subset of the eFuse array 122.

In the embodiment of FIG. 2, the eFuse array 122 comprises N eFuses (Fn), such that n ranges from 1 to N (depicted as F1, F2, F3 . . . FN). Each eFuse Fn and the main DC power eFuse F provides its own voltage output 202 (Fn_v from F1_v to FN_v and F_v, respectively), current output 204 (Fn_i from F1_i to FN_i and F_i, respectively), and temperature output 206 (Fn_t from F1_t to FN_t and F_t, respectively). In an embodiment, each eFuse F1 through FN may be limited to measuring current in one direction, e.g., from the DC power bus 124 through the eFuse. Thus, in the embodiment of FIG. 2, current output from sources (S) through the corresponding eFuses FN-1 and FN may be alternatively provided, for example from additional current sensing hardware or through bus 130 data provided by the sources (S). Each eFuse Fn and main DC power eFuse F also has a respective control input (Ctrln from Ctrl1 to CtrlN and Ctrl, respectively) for controlling respective operating parameters, and its own on/off control that is used to control load current through its channel (on/offn from on/off1 to on/offN and on/off, respectively). With regard to the operating parameters, which are stored in memory 54, each eFuse Fn has a programmable threshold for its current limit vs. time to emulate legacy fuses (i.e., slow burn and/or fast burn fuses). A sensor bus 208 communicates the voltage, current, and temperature outputs 202, 204, 206, respectively, from each eFuse Fn. The bus 105 that operably couples the control module 104 to the eFuse array 122 is a combination of the sensor bus 208, a control bus 210, an on/off bus 212, and a low power bus. The control module 104 ongoingly runs diagnostics/prognostics on the load current Fn_i through each eFuse, the voltage Fn_v of each eFuse, and the temperature Fn_t of each eFuse and the same metrics of the main DC power eFuse (F) as described in additional detail herein.

In the example, multiple (p) loads (L) are depicted as L1, L2, L3, . . . LP (individually, each load is Lp, as p ranges from 1 to P). Each load Lp may have a different load current demand or requirement. Loads may passive or smart, with smart loads including some level of self or commanded control of power requirements which may correspond to a level of performance available from the load's associated system. A preconfigured fuse harness 180 achieves, concurrently, the predefined load current demands of the multiple loads.

The preconfiguration of the fuse harness 180 is designed to meet the predefined load current demand from at least one load of the multiple loads by combining two or more eFuses via a cluster. The preconfiguration of the fuse harness 180 defines multiple (M) clusters (individually, each cluster is cluster_m, as m ranges from 1 to M). The preconfiguration of the fuse harness 180 specifies an arrangement and spatial location of each cluster of the M clusters, the arrangement and location of each cluster of the M clusters is a function of a predefined load current demand from each load of the multiple (P) loads (Lp).

Each cluster_m additively provides load currents from eFuses in the eFuse array and, as described further herein, may provide full or derated power redundancy for continued operation of associated loads in the event of an eFuse fault. The individual eFuses that are joined in a cluster_m are called cluster members, or members of a cluster.

In the non-limiting example of FIG. 2, the preconfiguration of the fuse harness 180 defines the following: F1 is solely coupled to L1, F2 is solely coupled to L2, a cluster_1 combines load currents from F3, F4, F5 and F6 to supply the load current demands of L3, and a cluster_M combines load currents from FN-3 and FN-2 to supply the load current demands of LP.

As FIGS. 1-2 illustrate, the fuse harness 180 is preconfigured to meet the power and load current demands of the multiple loads. Embodiments of the present SEC 102 leverage information related to the programming of the fuse harness 180 to dynamically adapt the load current output and power of the eFuse array 122, to enable a more robust fuse harness 180 operation, a more robust provision of necessary current to loads onboard the vehicle, and overall improved energy management strategy for the vehicle.

Figure 3:
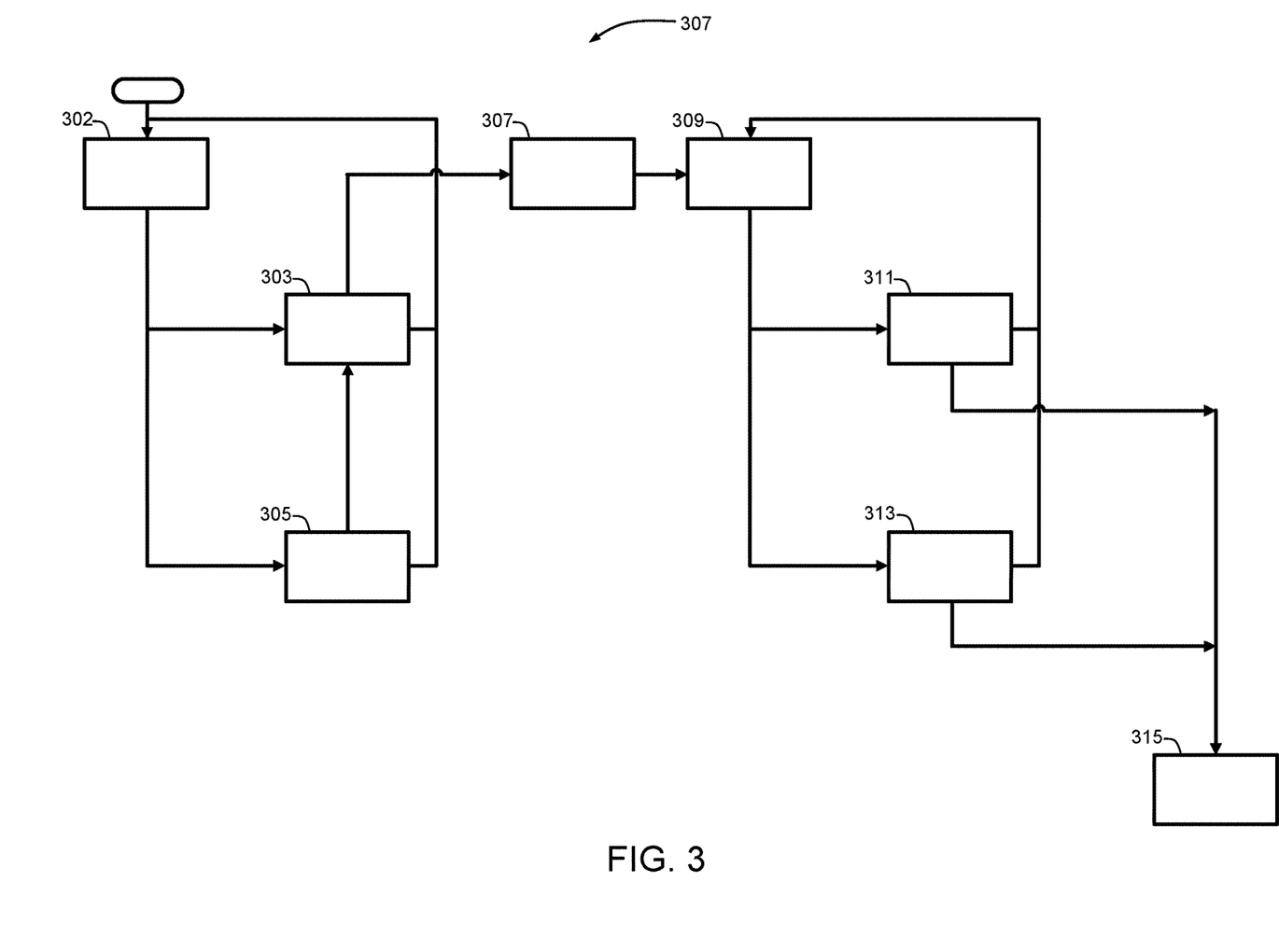
FIG. 3 illustrates a flow chart of a method, in accordance with one or more embodiments.

Turning now to FIG. 3, and with continued reference to FIGS. 1-2, various method tasks and associated exemplary application process modules of the SEC 102 are described. FIG. 3 illustrates steps of a method 300 employing one or more application modules that may be operating in the SEC 102.

In an application, each module may be realized as one or more sub-modules, and the modules and sub-modules may be distributed among various onboard systems and components. In various examples, the program 56 and stored variables and pre-loaded custom data 58 embody the application process modules of the SEC 102.

For illustrative purposes, the following description of method 300 may refer to elements mentioned above in connection with FIGS. 1-3. In various embodiments, portions of method 300 may be performed by different components of the described SEC 102. It should be appreciated that method 300 may include any number of additional or alternative operations and tasks, the tasks shown in FIG. 3 need not be performed in the illustrated order, and method 300 may be incorporated into a more comprehensive procedure or method, such as an energy saving or safety application, having additional functionality not described in detail herein. Moreover, one or more of the tasks shown in FIG. 3 could be omitted from an embodiment of the method 300 if the intended overall functionality remains intact.

A data acquisition module may manage the tasks of concurrently receiving sensor data from the sensor bus 208 and caching it. This is represented at 302, by the task of receiving and caching, from each Fn of the eFuse array and the main DC power eFuse F, a respective self-reported load current output (Fn_i, F_i), voltage output (Fn_v, F_v) and temperature output (Fn_t, F_t). The data acquisition module may similarly receive and process data over the communication bus 130 from loads, sources and other vehicle controllers including the vehicle controller 108. Such bus data may include, for example, respective load current and voltage data. The data acquisition module may further include data processing such as filtering, averaging, debouncing, interpolating and synchronizing the various data.

Individual eFuse health checks may be performed by an eFuse health check module at 303 whereat eFuse self-diagnosed faults and self-reported current, voltage and temperature outputs of the eFuses may be used to diagnose anomalous conditions or operation at the eFuse level. For example, the current, voltage and temperature outputs of the eFuses may be checked against acceptable, preset operating ranges to determine acceptable or out of range anomalous behavior.

SEC 102 rationality checks may be performed by a rationality check module at 305 whereat SEC 102 current balancing may be checked. Current balance is assumed in a properly operating SEC 102—that is power currents into and out of the SEC, including load currents and source currents, will ideally sum to zero. Unbalanced currents may be indicative of faulty current output reporting and indicates a rationality failure or fault. Thus, Ibatt+Isource≈Iloads in a fault free SEC 102 where, in the embodiment of FIG. 2, Ibatt is the current (F_i) into the SEC 102 from the battery (B) to the DC power bus 124, Isource is an aggregate current from the summation of all eFuse source current outputs ($\Sigma_{n=N-1}^{N}$ Fn_i) into the SEC 102 from all electrical energy sources (S) to the DC power bus 124, and Iloads is an aggregate current from the summation of all eFuse load current outputs ($\Sigma_{n=1}^{N-2}$ Fn_i) distributed from the DC power bus 124 of the SEC 102 to all loads L. The eFuse health check module at 303 and the rationality check module at 305 may be performed periodically during ongoing vehicle operation. As illustrated in FIG. 3, the eFuse health check module at 303 may also be event triggered upon an irrational result from the rationality check module at 305. Where no faults are detected at either 303 or 305, the method 300 continues data acquisition tasks at 302 and periodic health and rationality check at 303 and 305, respectively.

Fault detection at 303 or 305 may initiate a recovery module at 307 whereat faults indicated by the rationality check at 305 may be isolated to a particular eFuse and the affected loads (L) or sources (S) and the vehicle controller 108 may be notified via the communication bus 130 of a detected fault and remedial action such as user reporting, eFuse derating or load/source derating may be invoked. The recovery module 307 may additionally perform tasks related to remedial actions taken by the SEC including additional diagnostics and monitoring, derating of eFuses and reallocation of currents among eFuses as further described herein.

In an embodiment, various additional rationality checks may be performed at 307 useful in fault isolation and determining the course of remedial actions taken. One or more of current, voltage and temperature rationality checks may be performed. In an embodiment, a current check may be performed at 307. In the present embodiment of FIG. 2, eFuse F3 may self-report faulty current output data or report an out of range current output. Thus, the current output for eFuse F3 (F3_t) may be approximated based on the remaining self-reported current outputs of the other eFuses. Any one eFuse may be isolated in a rationality check using current balancing. This may be useful in validating self-reported current output anomalies or in isolating an eFuse responsible for failure of the current balancing rationality check at 305 where self-reported current outputs appear to be in range. For example, in the present embodiment of FIG. 2, eFuse F3 may self-report an in range current output. The current output for eFuse F3 (F3_i) may be approximated through the current balance relationship F3_i≈Ibatt+ Isources−Iloads, wherein Iloads is the aggregate current from the summation of all eFuse load current outputs ($\Sigma_{n=1}^{N-2}$ Fn_i) excepting F3_i. The eFuse F3 approximated current F3_i may be checked against the self-reported current output and a diagnosis of an eFuse data fault (i.e., eFuse reporting fault in current output) may be probable where a mismatch exists. Such a non-functional data fault may be handled by continued current balance monitoring of the current output of eFuse F3 whereas a functional fault may require more aggressive remedial measures including derating eFuse F3 or turning off eFuse F3, derating the affected load or source performance, increasing temperature monitoring of eFuse F3 including temperature output F3_t and rationality temperature checks of physically adjacent eFuses (e.g., F2_t and F4_t). Remedial options may be more limited where a single eFuse is tasked with current distribution to a given load, and may include additional temperature monitoring and turning off of the affected eFuse. However, remedial options for eFuse clusters may further include derating the affected eFuse up to and including turning the affected eFuse off and reallocation of the affected eFuse currents to other eFuses in the same cluster. Reallocation may include increasing current limits and acceptable ranges for current outputs, derating affected loads and sources, as well as additional temperature monitoring of the remaining active cluster eFuses. In an embodiment, the number of eFuses in a cluster may be specified such that a single eFuse failure may readily be absorbed by the remaining eFuses of the cluster without any derating of the affected load or source, advantageously providing for an uncompromised recovery with full performance from the affected load or source.

In an embodiment, a temperature check may be performed at 307, for example in the case where the temperature output of an eFuse is anomalous (e.g., out of range, unreported, intermittent, etc,). For example, in the present embodiment of FIG. 2, eFuse F3 may self-report faulty temperature output data or report an out of range temperature output. Thus, the temperature output for eFuse F3 (F3_t) may be approximated by averaging temperatures F2_t and F4_t from physically adjacent eFuses F2 and F4. If the physically adjacent eFuse temperatures are not out of range, then a diagnosis of an eFuse data fault (i.e., eFuse reporting fault in temperature output) may be more probable than a functional fault whereas a temperature out of range may result in a more probable diagnosis of a functional fault. Non-functional faults may be handled by continued temperature monitoring of the temperature output of physically adjacent eFuses F2 and F4 whereas a functional fault may require more aggressive remedial measures including derating eFuse F3 or turning off eFuse F3, increasing temperature monitoring of the temperature output of physically adjacent eFuses F2 and F4. Remedial options may be more limited where a single eFuse is tasked with current distribution to a given load, and may include additional temperature monitoring and turning off of the affected eFuse. However, remedial options for eFuse clusters may further include derating the affected eFuse up to and including turning the affected eFuse off and reallocation of affected eFuse currents to other eFuses in the same cluster. Reallocation may include increasing current limits and acceptable ranges for current outputs, derating affected loads and sources, as well as additional temperature monitoring of the remaining active cluster eFuses.

In an embodiment, a voltage check may be performed at 307, for example in the case where the voltage output of an eFuse is anomalous (e.g., out of range, unreported, intermittent, etc,). For example, in the present embodiment of FIG. 2, eFuse F3 may self-report faulty voltage output data or report an out of range voltage output. Thus, the voltage output for eFuse F3 (F3_v) in a cluster may be approximated by referencing the voltage outputs Fn_v from other eFuses within the same cluster since the outputs are linked. However, in the case of a single eFuse servicing a load or source, the voltage output for eFuse F3 (F3_v) may be calculated by the difference of the input voltage (i.e., voltage output F_v from the main DC power eFuse F) less the voltage drop across the eFuse F3 FET which may be determined from a known RDS(on) and the current output from the eFuse F3. RDS(on) may be a stored calibration and may vary as a function of eFuse F3 temperature output. Alternatively, or additionally as a further rationality check, the affected load or source may report voltages via communication bus 130. If the calculated or system reported eFuse voltages are not out of range, then a diagnosis of an eFuse data fault (i.e., eFuse reporting fault in voltage output) may be more probable than a functional fault whereas a voltage out of range may result in a more probable diagnosis of a functional fault. Non-functional faults may be handled by continued temperature monitoring of the temperature output of physically adjacent eFuses F2 and F4 whereas a functional fault may require more aggressive remedial measures including derating eFuse F3 or turning off eFuse F3, increasing temperature monitoring of the temperature output of physically adjacent eFuses F2 and F4. Remedial options may be more limited where a single eFuse is tasked with current distribution to a given load, and may include additional temperature monitoring and turning off of the affected eFuse. However, remedial options for eFuse clusters may further include derating the affected eFuse up to and including turning the affected eFuse off and reallocation of affected eFuse currents to other eFuses in the same cluster. Reallocation may include increasing current limits and acceptable ranges for current outputs, derating affected loads and sources, as well as additional temperature monitoring of the remaining active cluster eFuses.

The previous examples relate primarily to self-reporting anomalies of eFuse current output, voltage output or temperature output. Additional diagnostic advantages relating, for example, to fuse harness 180 may also be detectable and remedied in similar fashion. For example, an open wiring fault in the conductor after the output of eFuse F3 may manifest as the respective current output F3_i out of range or substantially zero. Where such an eFuse is one in a cluster, the other cluster eFuses may exhibit higher than expected or out of range current outputs also. Remediation for an open wiring fault may be treated most similarly to a functional fault of the eFuse as previously described including turning off eFuse F3, and in the case of eFuse clusters may further include reallocation of the affected eFuse currents to other eFuses in the same cluster. Reallocation may include increasing current limits and acceptable ranges for current outputs, derating affected loads and sources, as well as additional temperature monitoring of the remaining active cluster eFuses.

Additional diagnostic advantages relating, for example, to eFuse internal shorts (i.e., FET DS shorting) may also be detectable and remediated in similar fashion. For example, an internal FET short may be self-detected or may be detected by various rationality checks. For example, the affected eFuse output current or aggregated eFuse cluster output currents may not match load or source reported current, or eFuse current output determined by current balancing may not match, thus indicating a data fault (i.e., eFuse reporting fault in current output). Remedial options for internal eFuse shorts may be limited by the fact that the eFuse may not be capable of being turned off. Thus, for eFuse shorts, with the recognition that eFuse functional control is compromised, more frequent temperature monitoring, with direct temperature output and/or indirect temperature determination of physically adjacent eFuses, and voltage output monitoring if available, may be used to initiate affected load and source derating or load and source deactivations.

Having thus determined a fault through the high level diagnostics 303 and 305, and evaluated faults, determined and implemented remediations, continued monitoring of the SEC102 is performed at 309 including a data acquisition module managing the tasks of concurrently receiving, caching and processing self-reported eFuse data from the sensor bus 208, alternate data from loads and sources via bus 130 data and other calculated and derived data such as from current balancing, and neighboring eFuse temperature and voltage data as described herein. Periodic health checks of self-diagnosed faults and current, voltage and temperature outputs of the eFuses may be managed at 311 accounting for increased frequency as required during remedial operation as described herein. Periodic rationality checks at the SEC 102 level and the eFuse level may be managed at 311, including current balance, temperature agreement and voltage agreement using the self-reported eFuse data, alternate data from loads and sources via bus 130 data and other calculated and derived data such as from current balancing, and neighboring eFuse temperature and voltage data as described herein. Where no faults are detected at either 311 or 313, the method 300 continues data acquisition tasks at 309 and periodic health and rationality check at 311 and 313, respectively. Fault detection at 311 or 313 initiates a recovery module at 315 whereat the affected loads (L) or sources (S) and the vehicle controller 108 may be notified via the communication bus 130 of a detected fault and remedial action such as user reporting, derating or limiting performance, may be invoked. The recovery module 315 may additionally perform tasks related to remedial actions taken by the SEC including additional diagnostics and monitoring, derating of eFuses and reallocation of currents among eFuses as further described herein.

Having described the SEC 102, it may be appreciated that in various embodiments, there could be one or more SECs 102 connected to the same battery in the battery management system 182, with each of them connected to different loads in the vehicle—this could happen when there are more loads in the systems onboard the vehicle 100 then available outputs from a single SEC 102. For example, a vehicle may require 150 individual eFuses and each SEC 102 may be limited to 100 eFuses. In this case, two SECs 102 would be needed to cover the electrical systems of the vehicle 100. In another embodiment, true redundancy such as in a two motor, split torque electric power steering system may require an independent SEC for powering each motor. Each such SEC 102 may operate as described herein to provide diagnostics and remedial operation with respect to each respective motor, and may through appropriate eFuse capacity be able to meet the power requirements of both motors through the power distribution eFuses of either such SEC 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electrical power distribution system, comprising:
a plurality of electronic fuses self-reporting respective currents, voltages and temperatures coupled between a direct current (DC) power bus and a plurality of loads;
at least one main DC power electronic fuse coupled between a DC power source and the DC power bus; and
a control module:
performing a current balancing rationality check based upon all self-reported currents through the plurality of electronic fuses; and
when the current balancing rationality check indicates a faulty self-reported current, identifying the one of the plurality of electronic fuses corresponding to the faulty self-reported current through current balancing based upon non-faulty self-reported currents, and remediating the identified one of the plurality of electronic fuses corresponding to the faulty self-reported current selectively including substituting a calculated current for the faulty self-reported current based upon other self-reported currents.

2. The electrical power distribution system of claim 1, wherein the plurality of electronic fuses self-report respective voltages, further comprising the control module performing a voltage rationality check for one of the plurality of electronic fuses in a cluster of electronic fuses servicing a common load based upon self-reported voltage outputs from others of the plurality of electronic fuses in the cluster of electronic fuses servicing the common load.

3. The electrical power distribution system of claim 1, wherein the plurality of electronic fuses self-report respective voltages, further comprising the control module performing a voltage rationality check for one of the plurality of electronic fuses servicing a load based upon a voltage reported by the load.

4. The electrical power distribution system of claim 1, wherein the plurality of electronic fuses self-report respective voltages, further comprising the control module performing a voltage rationality check for one of the plurality of electronic fuses servicing a load based upon a calculated voltage drop across the one of the plurality of electronic fuses.

5. The electrical power distribution system of claim 1, wherein the plurality of electronic fuses self-report respective temperatures, further comprising the control module performing a temperature rationality check for one of the plurality of electronic fuses based upon self-reported temperature outputs from another of the plurality of electronic fuses physically adjacent to the one of the plurality of electronic fuses.

6. The electrical power distribution system of claim 1, wherein the plurality of electronic fuses self-report respective temperatures, and wherein the control module remediating the identified one of the plurality of electronic fuses further comprises performing rationality checks upon the self-reported temperature of the identified one of the plurality of electronic fuses based upon the self-reported temperature of at least one other of the plurality of electronic fuses that is physically adjacent to the identified one of the plurality of electronic fuses.

7. The electrical power distribution system of claim 1, wherein the control module remediating the identified one of the plurality of electronic fuses further comprises derating the identified one of the plurality of electronic fuses.

8. The electrical power distribution system of claim 1, wherein the control module remediating the identified one of the plurality of electronic fuses further comprises derating a load serviced by the identified one of the plurality of electronic fuses.

9. The electrical power distribution system of claim 1, wherein the identified one of the plurality of electronic fuses comprises one of a subset of the plurality of electronic fuses servicing a common load, wherein the control module remediating the identified one of the plurality of electronic fuses further selectively includes turning off the identified one of the plurality of electronic fuses and reallocating current from the identified one of the plurality of electronic fuses to others of the subset of the plurality of electronic fuses servicing the common load.

10. The electrical power distribution system of claim 9, wherein the control module remediating the identified one of the plurality of electronic fuses further includes adjusting current limits of the others of the subset of the plurality of electronic fuses servicing the common load.

11. An electrical power distribution system, comprising:
a first plurality of electronic fuses self-reporting respective currents, voltages and temperatures, the first plurality of electronic fuses coupled between a direct current (DC) power bus and a plurality of loads;
a second plurality of electronic fuses self-reporting respective currents, voltages and temperatures, the second plurality of electronic fuses coupled between the DC power bus and at least one DC power source;
at least one main DC power electronic fuse coupled between a battery management system and the DC power bus; and
a control module:
performing a current balancing rationality check based upon all self-reported currents through the first plurality of electronic fuses, the second plurality of electronic fuses and a current through the at least one main DC power electronic fuse;
when the current balancing rationality check indicates a faulty self-reported current, identifying the one of the first and second pluralities of electronic fuses corresponding to the faulty self-reported current through current balancing based upon other self-reported currents, and remediating the identified one of the first and second pluralities of electronic fuses corresponding to the faulty self-reported current including substituting a calculated current for the faulty self-reported current based upon other non-faulty self-reported currents;
performing a diagnostic check of the self-reported currents, voltages and temperatures of the first and second pluralities of electronic fuses to detect an anomalous self-reported current, an anomalous self-reported voltage or an anomalous self-reported temperature;
when the diagnostic check indicates an anomalous self-reported current, identifying the one of the first and second pluralities of electronic fuses corresponding to the anomalous self-reported current, and remediating the identified one of the first and second pluralities of electronic fuses corresponding to the anomalous self-reported current including substituting a calculated current for the anomalous self-reported current based upon other non-anomalous self-reported currents;
when the diagnostic check indicates an anomalous self-reported voltage, identifying the one of the first and second pluralities of electronic fuses corresponding to the anomalous self-reported voltage and an associated load, and remediating the identified one of the first and second pluralities of electronic fuses corresponding to the anomalous self-reported voltage including substituting one of a) a self-reported voltage from one or more electronic fuse of the first and second pluralities commonly coupled to the associated load, b) a voltage reported from the associated load, and c) a voltage calculated based upon a voltage drop across the one of the first and second pluralities of electronic fuses corresponding to the anomalous self-reported voltage; and when the diagnostic check indicates an anomalous self-reported temperature, identifying the one of the first and second pluralities of electronic fuses corresponding to the anomalous self-reported temperature, and remediating the identified one of the first and second pluralities of electronic fuses corresponding to the anomalous self-reported temperature including substituting a self-reported temperature from one or more electronic fuse of the first and second pluralities of electronic fuses physically adjacent to the one of the first and second pluralities of electronic fuses corresponding to the anomalous self-reported temperature.

12. The electrical power distribution system of claim 11, wherein the control module remediating the identified one of the first and second pluralities of electronic fuses corresponding to the anomalous self-reported current further comprises derating the identified one of the first and second pluralities of electronic fuses corresponding to the anomalous self-reported current.

13. The electrical power distribution system of claim 11, wherein the control module remediating the identified one of the first and second pluralities of electronic fuses corresponding to the anomalous self-reported current further comprises derating a load serviced by the identified one of the plurality of electronic fuses.

14. The electrical power distribution system of claim 11, wherein the identified one of the first and second pluralities of electronic fuses corresponding to the anomalous self-reported current comprises one of a subset of the first and second pluralities of electronic fuses servicing a common load, wherein the control module remediating the identified one of the first and second pluralities of electronic fuses corresponding to the anomalous self-reported current further selectively includes turning off the identified one of the first and second pluralities of electronic fuses corresponding to the anomalous self-reported current and reallocating current from the identified one of the first and second pluralities of electronic fuses corresponding to the anomalous self-reported current to others of the subset of the first and second pluralities of electronic fuses servicing the common load.

15. The electrical power distribution system of claim 14, wherein the control module remediating the identified one of the first and second pluralities of electronic fuses corresponding to the anomalous self-reported current further includes adjusting current limits of the others of the subset of the first and second pluralities of electronic fuses servicing the common load.

16. A method for power distribution, comprising:
coupling a first plurality of electronic fuses between a direct current (DC) power bus and a plurality of loads, wherein the first plurality of electronic fuses self-report respective currents, voltages and temperatures;
coupling a second plurality of electronic fuses between the DC power bus and at least one DC power source, wherein the second plurality of electronic fuses self-report respective currents, voltages and temperatures;
coupling at least one main DC power electronic fuse between a battery management system and the DC power bus;
performing a current balancing rationality check based upon all self-reported currents through the first plurality of electronic fuses, the second plurality of electronic fuses and a current through the at least one main DC power electronic fuse;
when the current balancing rationality check indicates a faulty self-reported current, identifying the one of the first and second pluralities of electronic fuses corresponding to the faulty self-reported current through current balancing based upon other self-reported currents, and remediating the identified one of the first and second pluralities of electronic fuses corresponding to the faulty self-reported current including substituting a calculated current for the faulty self-reported current based upon other non-faulty self-reported currents;
performing a diagnostic check of the self-reported currents, voltages and temperatures of the first and second pluralities of electronic fuses to detect an anomalous self-reported current, an anomalous self-reported voltage or an anomalous self-reported temperature;
when the diagnostic check indicates an anomalous self-reported current, identifying the one of the first and second pluralities of electronic fuses corresponding to the anomalous self-reported current, and remediating the identified one of the first and second pluralities of electronic fuses corresponding to the anomalous self-reported current including substituting a calculated current for the anomalous self-reported current based upon other non-anomalous self-reported currents;
when the diagnostic check indicates an anomalous self-reported voltage, identifying the one of the first and second pluralities of electronic fuses corresponding to the anomalous self-reported voltage and an associated load, and remediating the identified one of the first and second pluralities of electronic fuses corresponding to the anomalous self-reported voltage including substituting one of a) a self-reported voltage from one or more electronic fuse of the first and second pluralities commonly coupled to the associated load, b) a voltage reported from the associated load, and c) a voltage calculated based upon a voltage drop across the one of the first and second pluralities of electronic fuses corresponding to the anomalous self-reported voltage; and
when the diagnostic check indicates an anomalous self-reported temperature, identifying the one of the first and second pluralities of electronic fuses corresponding to the anomalous self-reported temperature, and remediating the identified one of the first and second pluralities of electronic fuses corresponding to the anomalous self-reported temperature including substituting a self-reported temperature from one or more electronic fuse of the first and second pluralities of electronic fuses physically adjacent to the one of the first and second pluralities of electronic fuses corresponding to the anomalous self-reported temperature.

17. The method for power distribution of claim 16, wherein remediating the identified one of the first and second pluralities of electronic fuses corresponding to the anomalous self-reported current further comprises derating the identified one of the first and second pluralities of electronic fuses corresponding to the anomalous self-reported current.

18. The method for power distribution of claim 16 wherein remediating the identified one of the first and second pluralities of electronic fuses corresponding to the anomalous self-reported current further comprises derating a load serviced by the identified one of the plurality of electronic fuses.

19. The method for power distribution of claim 16, wherein the identified one of the first and second pluralities of electronic fuses corresponding to the anomalous self-reported current comprises one of a subset of the first and second pluralities of electronic fuses servicing a common load, wherein remediating the identified one of the first and second pluralities of electronic fuses corresponding to the anomalous self-reported current further selectively includes turning off the identified one of the first and second pluralities of electronic fuses corresponding to the anomalous self-reported current and reallocating current from the identified one of the first and second pluralities of electronic fuses corresponding to the anomalous self-reported current to others of the subset of the first and second pluralities of electronic fuses servicing the common load.

20. The method for power distribution of claim 19, wherein remediating the identified one of the first and second pluralities of electronic fuses corresponding to the anomalous self-reported current further includes adjusting current limits of the others of the subset of the first and second pluralities of electronic fuses servicing the common load.

\* \* \* \* \*